(12) United States Patent
Harris

(10) Patent No.: US 11,595,528 B2
(45) Date of Patent: Feb. 28, 2023

(54) MEDIATED MULTI PARTY ELECTRONIC CONFERENCE SYSTEM

(71) Applicant: Scott C Harris, San Diego, CA (US)

(72) Inventor: Scott C Harris, San Diego, CA (US)

(*) Notice: Subject to any disclaimer, the term of this patent is extended or adjusted under 35 U.S.C. 154(b) by 0 days.

(21) Appl. No.: 17/656,197

(22) Filed: Mar. 23, 2022

(65) Prior Publication Data

US 2022/0321703 A1 Oct. 6, 2022

Related U.S. Application Data

(60) Provisional application No. 63/200,893, filed on Apr. 1, 2021.

(51) Int. Cl.
*H04M 3/56* (2006.01)
*G06V 40/16* (2022.01)
*H04L 12/18* (2006.01)

(52) U.S. Cl.
CPC .......... *H04M 3/568* (2013.01); *G06V 40/176* (2022.01); *H04L 12/1822* (2013.01); *H04M 2201/41* (2013.01); *H04M 2201/42* (2013.01); *H04M 2203/5072* (2013.01)

(58) Field of Classification Search
CPC .............................. H04M 3/568; H04M 3/56
See application file for complete search history.

(56) References Cited

U.S. PATENT DOCUMENTS 9,077,849 B2 * 7/2015 Meek .................. H04L 65/4038
9,342,845 B1 * 5/2016 Haugen ............... H04L 12/1822
2022/0311634 A1 * 9/2022 Sengupta ............ H04L 12/1831

* cited by examiner

*Primary Examiner* — Olisa Anwah

(57) ABSTRACT

An AI based moderator system for an electronic conference. The moderator scores users based on ratings and diversity, and attempts to keep a high rating person talking while maintaining diversity.

17 Claims, 4 Drawing Sheets

MEDIATED MULTI PARTY ELECTRONIC CONFERENCE SYSTEM

This application claims priority from Provisional application No. 63/200,893, filed Apr. 1, 2021, the entire contents of which are herewith incorporated by reference.

BACKGROUND

It has conventionally been very difficult to carry out a multiple person video conference.

For example, when there are multiple people on a video conference, it often becomes a free-for-all. People try to speak at the same time. No one can tell what anyone else is saying, and the "focus" keeps switching between different people as many people speak at once.

SUMMARY OF THE INVENTION

It might be possible to assign a moderator with some kind of supervisory access to a multi person electronic conference of this type. Such a moderator would have no way of stopping people from talking other than completely muting them. Moreover, it is believed that such a moderator could not make an unbiased decision of who should have the focus at any moment.

The inventor recognized that an artificial intelligence system can produce certain advantages in moderation of a multi person communication that might not be possible from a human moderator.

The present application describes a system that allows an artificial intelligence moderator to adjust control of who has is talking during a multi person conference. This is done by assigning scores based on current actions and previous actions of the users.

A system enables adjusting volumes based on the status of the person(s) speaking.

In different embodiments, the artificial intelligence moderator keeps maintenance over the volumes which can be presented to others, while allowing certain words to be heard by the others at low volumes, but preventing people from completely interrupting.

BRIEF DESCRIPTION OF THE DRAWINGS

In the Drawings:
the figures show aspects of the invention, and specifically.

DETAILED DESCRIPTION

The present application describes a system for using a computer-based AI to carry out actions that act as a moderator, for a multiple party virtual meeting system, e.g., a videoconference system. The system, as described herein, uses current information, past information, as well as information about the conference itself to score the different participants, and create a queue of users based on the scoring. The scoring in the queue sets who gets the focus position in the virtual meeting.

Figure 1:
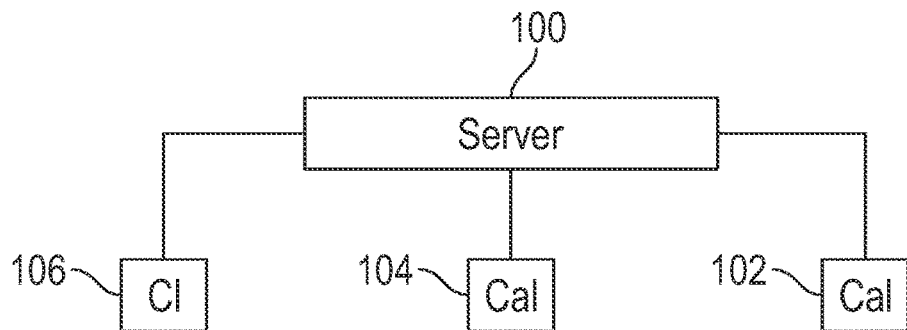
FIG. 1 shows a hardware block diagram.

An embodiment is shown in FIG. 1, which shows a server 100 which can be a distributed server or can include a process operating across different computer systems. The server 100 is contacted to assign a conference, and to form and manage the characteristics of the conference. The server 100 can connect to different clients, such as the client 102 and the client 104, and the client 106. This connection can be over any kind of data connection including a phone line or an Internet line. The conference can be a multiple participant video conference.

The data and information is obtained, managed and displayed in a special format as described herein, which, as programmed, renders this a special-purpose computer carrying out special functions as described herein. These functions cannot be carried out by a general purpose computer without modifying that computer using the techniques of the present disclosure.

Figure 2:
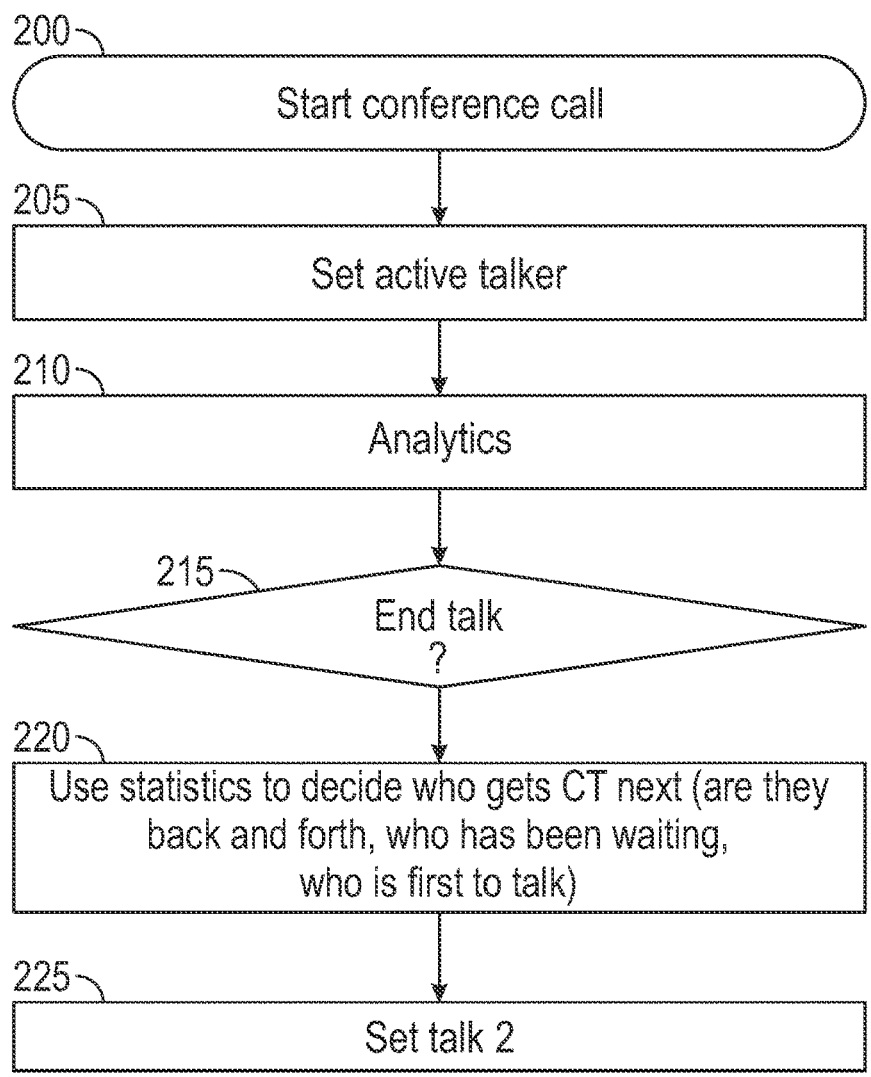
FIG. 2 shows a flowchart of operation.

The server operates according to the flowchart of FIG. 2, which shows the basic operating loop that is executed.

At 200, the server starts a conference call. An active talker, who has the "focus", is set at 205.

The initial focus may be set using different criteria. It can be, for example, the first person to sign up for the call, or the person who has initiated the call. However initially sent, the focus is adaptively changed over time using the analytics 210 as explained herein.

While the person is talking, the operations that the system can carried out are based on the analytics. When the person finishes talking at 215, the analytics are used at 220 to decide who gets the "focus" next. The analytics at 220, for example, can analyze the different aspects using the flowchart shown in FIG. 4. Different forms of analytics, as described herein, can use conference specific analytics that assess who should talk next, performance based analytics, and global analytics. Based on all of this information and specifically the AI analytics, the second talking party may be set at 225, and the process continues.

The analytics are used by the AI to determine who will be the next person who gets the focus.

While a person has the focus, the AI ensures their access to the floor. This uses the other talk flowchart routine of FIG. 3.

Figure 3:
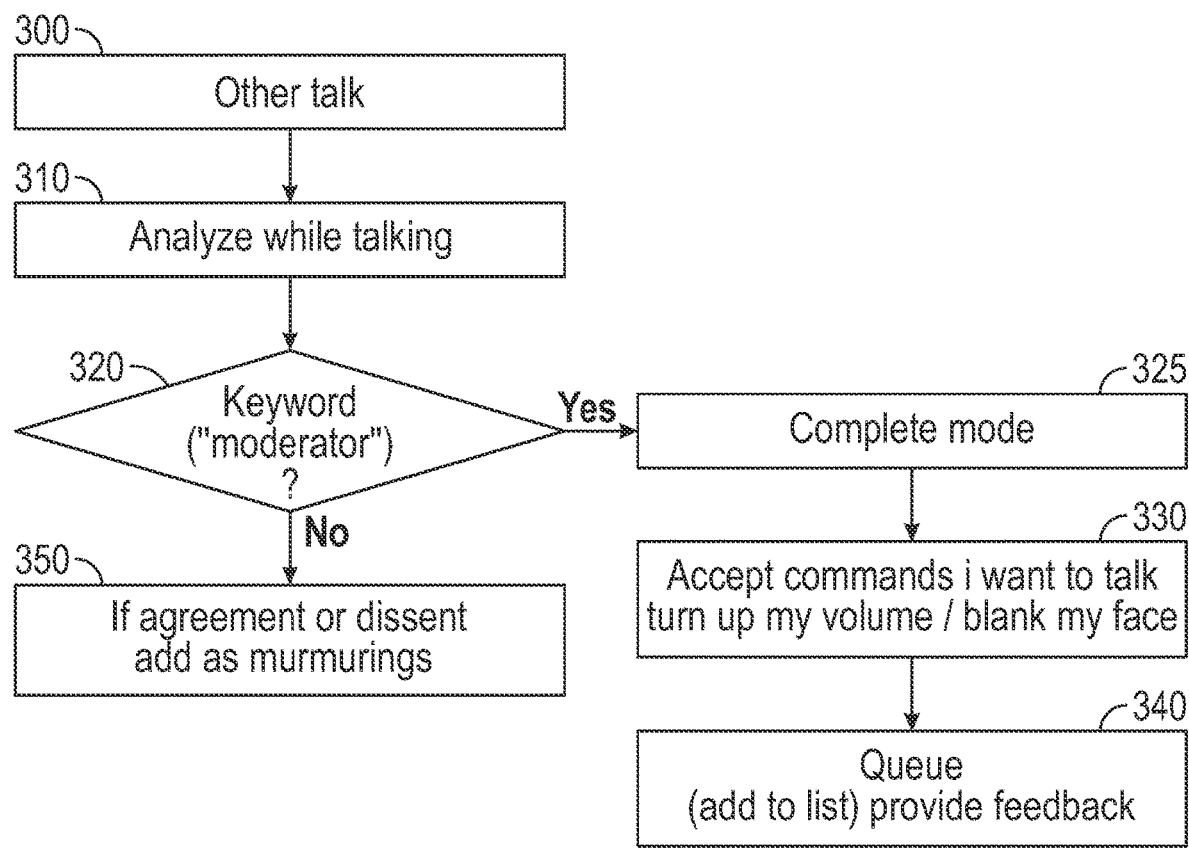
FIG. 3 shows a keyword moderating flowchart.

In FIG. 3, while person X has the floor, person Y (referred to as "other") may speak. This brings up the other talk routine at 300.

The system automatically analyzes non-focus voices while they are talking, shown as 310. The system may automatically maintain others as muted or reduced in volume, to avoid one person interrupting the other.

As an alternative, the system can listen while others are talking, and attempt to determine what they are saying, while they say it, by predicting the words that they are saying, and deciding if they should allow those words to be passed to the others. While the other is talking, the AI looks for keywords at 320. In this embodiment, the AI moderator may use the keyword "moderator" to signal an intent that the speaker is wanting to enter a command. So while looking for information, the system may look for the word "moderator".

If this word is detected, then the system automatically knows that this is an attempt to give a command.

At 325, the system institutes a complete mute on user Y, and at 330 accepts commands.

Exemplary commands can include 'I want to talk', or 'turn up my volume', or 'blank my face', or 'I don't like the way I look, change my picture', or others referred to in this document.

At 340, the system responds to this operation by carrying out an operation.

If the command is "I want to talk", the system may automatically add the person to a queue, and their position in the queue gets set using the analytics, described above.

Another command is to rate or complain or complement the current speaker. The user can say 'this speaker is boring' or other similar language indicating that the listener is not interested in the current speaker. This is used to provide feedback that is used as part of the analytics as described herein, and this information can be used both as conference specific analytics for the specific conference and the specific user and also as global analytics when this same user attempts to participate in other conferences.

If when the user talks, however, if they are making sounds of agreement, dissent, or exclamations, then the sounds may be added to the background as "murmuring". For instance, if someone cheers when the speaker says something, the cheer may be reduced in volume, and are heard in the background but not loud enough to interfere with the person who is talking. The same can be done with other sounds of agreement or disagreement, including boos and hisses, murmuring of agreements or disagreements are added to the background sounds, to allow them to be heard in the background.

Figure 4:
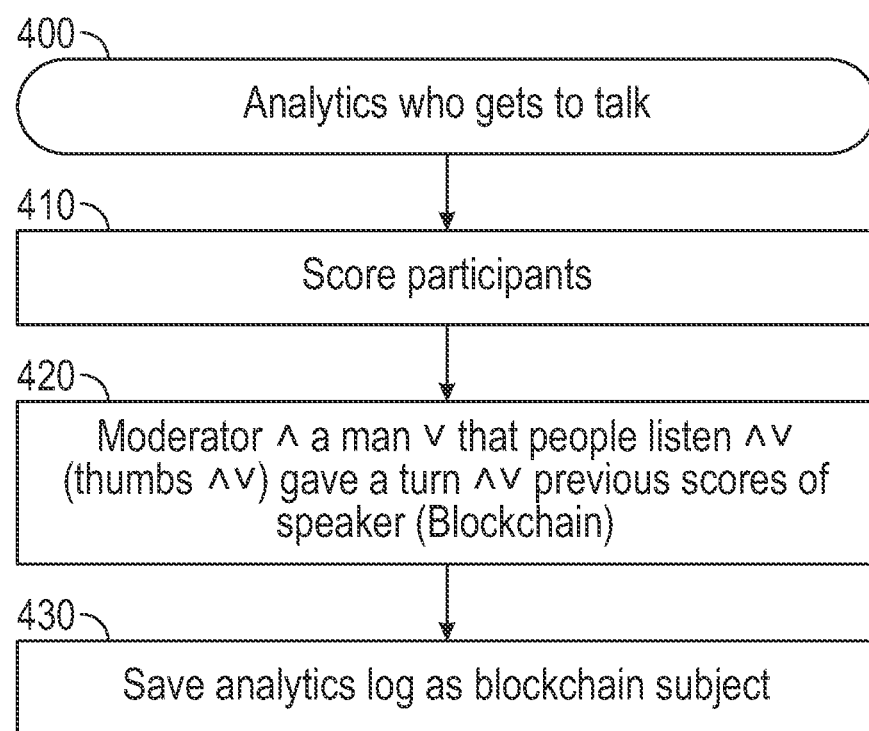
FIG. 4 shows an analytics flowchart that is run by the computer.
Figure 5:
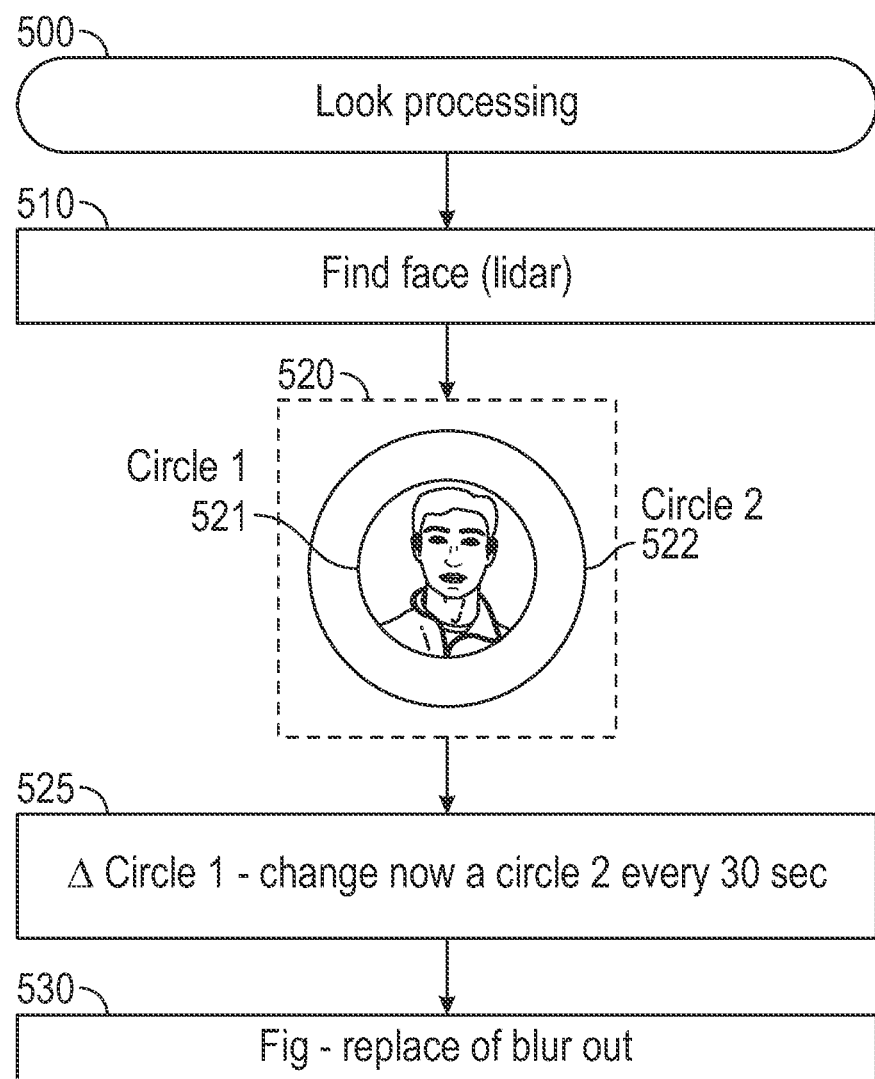
FIG. 5 shows a look processing flowchart that is read by the computer.

The analytics are shown in FIG. 4. These are used to determine the order of speakers. The analytics can include conference specific analytics that assess who should talk next based on characteristics of this specific conference, performance based analytics representing how other users feel about the speaker, and global analytics representing how the speaker is assessed in other conferences.

At 410, each of the participants is scored depending on their operation in the conference, and also based on the different things that they have done. Exemplary scoring shown at 420 includes whether the user the initiater. If so, their score increases greatly, in one embodiment, the initiater gets a sufficiently high score that it becomes difficult to out score them.

A next score issue determines if the user is someone that people listen to? In a camera operated conference, the AI can be watching attendees to determine, from their operations, actions and facial expressions, whether they are interested in the speaker.

Another score determines ratings of the person—do people rate this person well both in this conference and in other conferences. As part of the rating system, people can give thumbs up and thumbs down to speakers. The ratings may be used to determine the priority for their place in line. The analytics based on this conference determine, how often did people rake this person well when speaking in this conference Yet another score can be related to diversity, and can be an attempt to maintain diversity among the speakers. For example, it may be desirable to make sure that not all speakers in a row are white males. It may be desirable to give some priority to women, if women are underrepresented in their percentage of time on the floor, and to people of different ethnic and sexual backgrounds, and to people of different viewpoints. The diversity scoring can operate to assign a score increase bump to every attempted speaker who has a different diversity characteristic than the current speaker. The diversity characteristic can be determined by look, for example the AI can determine if the current speaker is a white male, and can automatically give a score bump to every nonwhite male. In a similar way, the current speaker being a Native American female can give a score bump to others who are not Native American females. In essence the diversity score bump can provide a temporary increase in score to everyone who is different than the current speaker, to attempt to make sure that many different viewpoints and backgrounds are adequately represented in the meeting/videoconference.

Another part of the rating can be based on this person's performance in other conferences. In order to carry this out, a distributed blockchain is maintained which maintains information about ratings of participants in all conferences. Based on information in the blockchain, a score is maintained for previous actions of the user. If the user is consistently rated as being boring open e.g. in other conferences), then they may have a bad score assigned to them, which may be used as part of the analytics at 320.

The blockchain is stored that may be stored by multiple different servers or by the server itself.

The blockchain can indicate information about the conference itself, including information about different participants in the conference, what they said in the conference, and they are rating in the conference. The rating can be not only the user created rating, but can also be a system created rating as described herein.

This user propensity may be specific to a specific subject. For example, the user may be deemed an expert in a certain category, and get a higher rating in that category then they get in other categories.

Other scores include conference specific scoring issues. One conference specific score assesses whether two people conventionally talking back and forth, and if so should they get the floor one after the other. Another conference specific score can be based on different people's expertise in the subject of the conference. For example, a conference about pandemic issues may score doctors higher than non-doctors, and may score infectious disease experts higher than general MDs.

Another conference specific score can include who has been waiting the longest for the floor.

During a videoconference, a user often gets to see themselves. One command which can be carried out is that of "look processing" that can be used to change the way the user looks on the videoconference. In one embodiment, the system is used that automatically can on command blank out parts of the background, referred to herein as silhouette processing at 500.

At 510, the system finds the users face, which can use a lidar or radar system to determine the distance to the user's face. The user's face is divided into quadrants at 520, for example an activity circle circle 1, 521 and a less activity circle 2 at 522. There will be more changes within the activity circle than in the less activity circle. A change in the main activity circle may be changed immediately, or within milliseconds. In contrast, changes in the secondary circle at 525 may be changed every 30 seconds. This has the effect of minimizing the necessary bandwidth while maintaining realism.

In addition, the system by using lidar can determine and carry out a very narrow field of focus, and can replace or blur out the background at 530.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodi-

What is claimed is:

1. A multiple party virtual meeting system, comprising:
a computer programmed to moderate among multiple participants of a meeting, to determine which of the multiple participants has a focus of the meeting at any particular time, by changing the focus using scoring of the participants of the meeting, the scoring using all of current information about each participant, past information about each participant, and information about the meeting itself, and using the scoring to create a queue of users that is ordered based on the scoring, wherein the system accepts input from users while another speaker has the focus, wherein one of the inputs is a rating of a current speaker indicating that the current speaker is either interesting or uninteresting to the user, and the rating is used as part of the scoring of current information about the speaker.

2. The system as in claim 1, wherein the meeting system is a meeting including audio, and the system determines when the user with the focus has finished talking, and uses the scoring to determine which of the multiple participants gets to talk next.

3. The system as in claim 1, wherein the system accepts input from users while another speaker has the focus.

4. The system as in claim 1, wherein the computer determines the ratings based on watching attendees to determine from actions and facial expressions of the attendees whether they are interested.

5. A multiple party virtual meeting system, comprising: a computer programmed to moderate among multiple participants of a meeting, to determine which of the multiple participants has a focus of the meeting at any particular time, by changing the focus using scoring of the participants of the meeting, the scoring using all of current information about each participant, past information about each participant, and information about the meeting itself, and using the scoring to create queue of users that is ordered based on the scoring, wherein the system accepts input from users while another speaker has the focus, wherein the input are sounds of agreement, dissent or exclamation from other speakers, and the computer adds those input sounds as a background sound as reduced in volume sounds, which are heard in the background but not loud enough to interfere with a participant who has the focus and is talking.

6. A multiple party virtual meeting system, comprising:
a computer programmed to moderate among multiple participants of a meeting, to determine which of the multiple participants has a focus of the meeting at any particular time, by changing the focus using scoring of the participants of the meeting, the scoring using all of current information about each participant, past information about each participant, and information about the meeting itself, and using the scoring to create a queue of users that is ordered based on the scoring, wherein the scoring uses characteristics of the specific conference representing how other users have scored information from a current speaker in this conference as the current information about each participant, and uses information about how a participant has been assessed in other conferences as the past information about the participant.

7. The system as in claim 6, wherein the scoring includes determining an ethnicity and sex of a person who has the focus, and increasing a score of those waiting for the focus who have a different ethnicity or sex than the person who has the focus.

8. A multiple party virtual meeting system, comprising:
a computer programmed to moderate among multiple participants of a meeting, to determine which of the multiple participants has a focus of the meeting at any particular time, by changing the focus using scoring of the participants of the meeting based on criteria, where the scoring in the queue who gets the focus position in the virtual meeting
the scoring includes determining an ethnicity and sex of a person who has a current focus and increasing a score of those waiting for the focus who have a different ethnicity or sex than the person who has the current focus,
to maintain ethnic and sexual diversity by using priorities to set the scoring of the users.

9. The system as in claim 8, wherein the scoring uses using uses characteristics of the specific conference representing how other users have scored information from a current speaker in this conference as current information about each participant, and uses information about how a participant has been assessed in other conferences as past information about the participant.

10. The system as in claim 8, wherein the system accepts input from users while another speaker has the focus.

11. The system as in claim 10, wherein one of the inputs is a rating of a current speaker indicating that the current speaker is either interesting or uninteresting to the user, and the rating is used as part of the scoring of current information about the speaker.

12. The system as in claim 10, wherein the input sounds are of agreement, dissent or exclamation from other speakers, and adds those input sounds as a background sound as reduced in volume sounds, which are heard in the background but not loud enough to interfere with the person who is talking.

13. A multiple party virtual meeting system, comprising:
a computer programmed to moderate among multiple participants of a meeting, to determine which of the multiple participants has a focus of the meeting at any particular time, by changing the focus using scoring of the participants of the meeting,
and using the scoring to create a queue of users that is ordered based on the scoring, wherein the system accepts input from users while another speaker has the focus,
wherein the input sounds are sounds of agreement, dissent or exclamation from other speakers, and the system adds those input sounds as a background sound as reduced in volume sounds, which are heard in the background but not loud enough to interfere with a participant who has the focus and is talking.

14. The system as in claim 13, wherein the scoring uses using uses characteristics of the specific conference representing how other users have scored information from a current speaker in this conference as the current information about each participant, and uses information about how the speaker has been assessed in other conferences as past information about the participant.

15. The system as in claim 13, wherein the system accepts input from users while another speaker has the focus.

16. The system as in claim 15, wherein one of the inputs is a rating of a current speaker indicating that the current speaker is either interesting or uninteresting to the user, and the rating is used as part of the scoring of current information about the speaker.

17. The system as in claim 13, wherein the scoring includes determining an ethnicity and sex of a person who has a current focus and increasing a score of those waiting for the focus who have a different ethnicity or sex than the person who has the current focus,
    to maintain ethnic and sexual diversity by using priorities to set the scoring of the users.

\* \* \* \* \*